United States Patent
Yamada

(10) Patent No.: US 9,578,337 B2
(45) Date of Patent: Feb. 21, 2017

(54) IMAGE QUALITY EVALUATING METHOD, IMAGE QUALITY EVALUATING APPARATUS AND IMAGE QUALITY EVALUATING PROGRAM

(75) Inventor: Toru Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 758 days.

(21) Appl. No.: 12/525,479

(22) PCT Filed: Jan. 30, 2008

(86) PCT No.: PCT/JP2008/051380
§ 371 (c)(1),
(2), (4) Date: Jul. 31, 2009

(87) PCT Pub. No.: WO2008/093714
PCT Pub. Date: Aug. 7, 2008

(65) Prior Publication Data
US 2010/0008425 A1  Jan. 14, 2010

(30) Foreign Application Priority Data
Jan. 31, 2007  (JP) ................................ 2007-021310

(51) Int. Cl.
*H04N 19/142* (2014.01)
*H04N 19/44* (2014.01)
(Continued)

(52) U.S. Cl.
CPC .......... *H04N 19/142* (2014.11); *H04N 17/004* (2013.01); *H04N 19/00533* (2013.01);
(Continued)

(58) Field of Classification Search
CPC ................... H04N 19/00163; H04N 19/00533; H04N 19/00939; H04N 7/26143; H04N 7/68; H04N 7/26335; H04N 17/004; H04N 19/142; H04N 19/44; H04N 19/895
(Continued)

(56) References Cited

U.S. PATENT DOCUMENTS 5,751,378 A * 5/1998 Chen ...................... G06T 7/2053
 348/699
6,574,277 B1 * 6/2003 Miyamoto ............... 375/240.13
(Continued)

FOREIGN PATENT DOCUMENTS

JP  2000-341588  12/2000
JP  2001-025014  1/2001
(Continued)

OTHER PUBLICATIONS

Extended European Search Report dated Mar. 14, 2016 received in related application EP 08710639.9.
(Continued)

*Primary Examiner* — Behrooz Senfi
*Assistant Examiner* — Maria Vazquez Colon
(74) *Attorney, Agent, or Firm* — Scully, Scott, Murphy & Presser, P.C.

(57) ABSTRACT

To estimate an image quality deterioration level at a high accuracy. An image quality deterioration level is estimated by judging whether image quality deterioration is suppressed or not by error concealment processing when decoding is not correctly performed, based on information obtained in decoding processing. When it is judged that error concealment is effectively operated, it is estimated that deterioration of an image quality even in an image region not correctly decoded is small. When it is estimated that error concealment is not effectively operated, it is estimated that image deterioration is heavy.

16 Claims, 7 Drawing Sheets

(51) Int. Cl.
*H04N 19/89* (2014.01)
*H04N 17/00* (2006.01)
*H04N 19/895* (2014.01)
*H04N 19/154* (2014.01)

(52) U.S. Cl.
CPC ..... *H04N 19/00939* (2013.01); *H04N 19/154* (2014.11); *H04N 19/44* (2014.11); *H04N 19/895* (2014.11); *H04N 7/26143* (2013.01); *H04N 19/00163* (2013.01)

(58) Field of Classification Search
USPC ............. 375/240.16, 240.27; 113/240.16
See application file for complete search history.

(56) References Cited

U.S. PATENT DOCUMENTS

| | | | | |
|---|---|---|---|---|
| 6,636,565 | B1* | 10/2003 | Kim | 375/240.27 |
| 6,788,878 | B1* | 9/2004 | Fujii et al. | 386/344 |
| 7,072,403 | B2* | 7/2006 | Kimoto | 375/240.27 |
| 7,110,450 | B1* | 9/2006 | Kimoto | 375/240 |
| 7,161,982 | B2* | 1/2007 | Kimoto | 375/240.13 |
| 2001/0026630 | A1* | 10/2001 | Honda | G06T 9/00 382/107 |
| 2004/0139462 | A1* | 7/2004 | Hannuksela | H04N 19/895 725/32 |
| 2007/0147500 | A1* | 6/2007 | Chono | H04N 19/172 375/240.12 |
| 2008/0225946 | A1* | 9/2008 | Yin et al. | 375/240.12 |

FOREIGN PATENT DOCUMENTS

| | | |
|---|---|---|
| JP | 2003-298554 | 10/2003 |
| JP | 2005-142900 | 6/2005 |

OTHER PUBLICATIONS

Gennari, G. et al., "A robust H.264 Decoder with Error Concealment Capabilities", Proceedings of the European Signal Proceedings Conference, vol. XII, Sep. 6, 2004, pp. 649-652.

Delicado, F. et al., "Error Resilient in MPEG-2 Video Transmission Over Wireless ATM Networks", Proceedings of the IEEE Conference 2000 on High Performance Switching and Routing, Jun. 26, 2000, pp. 343-351.

Reibman, A. R. et al., "Quality monitoring of video over the Internet", Conference Record of the 36th Asilomar conference on Signals, Systems & Computers, Nov. 3-6, 2002, pp. 1320-1324.

Van Den Branden Lambrecht, C. et al., "Perceptual Quality Measure using a Spatio-Temporal Model of the Human Visual System", Optomechatronic Micro/Nano Devices and Components III, Oct. 8-10, 2007, vol. 2668, Mar. 22, 1996, pp. 450-461.

Yamada, T. et al., "No-reference video quality estimation based on error-concealment effectiveness", Packet Video 2007, IEEE, Nov. 1, 2007, pp. 288-293.

ITU-T (International Telecommunication Union) Rec. J.144, Mar. 2004, pp. 1-162.

* cited by examiner

IMAGE QUALITY EVALUATING METHOD, IMAGE QUALITY EVALUATING APPARATUS AND IMAGE QUALITY EVALUATING PROGRAM

TECHNICAL FIELD

The present invention relates to an image quality evaluating method, an image quality evaluating apparatus, and an image quality evaluation program. Particularly, the present invention relates to an image quality evaluating method, an image quality evaluation apparatus, and an image quality evaluating program, each which evaluates the image quality at the time of image reception, based on transmitted image data.

BACKGROUND OF THE RELATED ART

Methods for objectively evaluating the qualities of videos are classified into three types. That is, the first method is a method for directly comparing an original image and a degraded image to evaluate the quality of an image. The second method is a method for extracting only the characteristic amount of an original image and then evaluating the image quality based on the extracted characteristic amount and the degraded image. The third method is a method for evaluating an image quality based on only degraded images.

A specific example of the first method is recommended by ITU-T (International Telecommunication Union Telecommunication Standardization Sector), as described in non-patent document 1. However, the application for transmitting videos from a transmitter to receivers has an upper limit of a transmission line band, which makes it difficult transmit original images. If original images are not transmitted, the receiver cannot evaluate the image quality using the first method.

Moreover, the second method requires multiplexing the characteristic amount of an original image to original transmission image data and then transmitting the resultant data or transmitting the characteristic amount of an original image via another transmission line. When the characteristic amount of an original image is multiplexed and transmitted, the existing transmitter has to be replaced. Transmitting the characteristic amount of an original image via another transmission line requires replacing the existing communication system including the transmitter. In other words, the problem is that it is difficult to implement new operations in the existing system.

The third method has an advantage over merely requiring a replacement of the receiver because information on original images is not totally required, thus facilitating new operations. The image quality evaluating apparatus that estimates the image quality based on received data only, without using original images, is disclosed in the patent documents 1 and 2. In the image evaluating apparatus disclosed in the patent document 1, when received data is not correctly decoded due to, for example, an occurrence of transmission error on the transmission line, which transmits image data encoded for data amount compression, the number of regions where errors (errors in image data) have occurred is measured to determine it as a level of image quality degradation.

As described in the patent document 1, when image data cannot be decoded correctly, the decoding apparatus generally performs an error concealment process (an error hiding process), which obscures regions not correctly decoded, to video frames. By doing so, end users view images subjected to the error concealment process.

Patent document 1: Japanese patent Laid-open publication No. 2000-341588 (paragraphs 0044, 0072, 0095)
Patent document 2: Japanese patent Laid-open publication No. 2001-25014
Non-patent document 1: ITU-T recommendation J.144, March, 2004

DISCLOSURE OF THE INVENTION

Problems to be Solved by the Invention

However, in the image quality evaluation apparatus described in the patent documents 1 and 2, the effectiveness of error concealment is not considered and the level of image quality degradation is decided using only the number of samples (the number of regions in the patent document 1), not decoded correctly. As a result, the problem is that the correlation between an evaluated image quality and an actual image quality becomes low.

The object of the present invention is to provide an image quality evaluating method, an image quality evaluating apparatus, and an image quality evaluating program, each which can estimate the degradation of an image quality with high precision by deciding the effectiveness of error concealment and reflecting the effectiveness of error concealment to the level of degradation in image quality.

Means to Solve the Problems

According to the present invention, an image quality evaluating method is applied suitably to an image decoding system for executing an error concealment process that decodes compressed image data and recovers an error in image data. The image quality evaluating method is characterized by the steps of judging an effectiveness of an error concealment process executed in the decoding process, which decodes compressed image data and estimating a level of image quality degradation, based on a judged effectiveness.

According to the present invention, an image quality evaluating apparatus is used in an image decoding system that includes a decoding processing section for decoding compressed image data and an error concealment processing section for executing an error concealment process, which recovers an error in the image data. The image quality evaluating apparatus comprises an error concealment effectiveness judgement processing section for judging an effectiveness of an error concealment process executed by said error concealment processing section in a decoding process, which decodes compressed image data; and an image quality degradation estimation processing section for estimating a level of image quality degradation, based on an effectiveness decided by the error concealment effectiveness judgement processing section.

According to the present invention, an image quality evaluating program directs a computer, which is used suitably to an image decoding system that executes a decoding process that decodes compressed image data and executes an error concealment process that recovers an error in image data, to execute the steps of deciding an effectiveness of an error concealment process executed in the decoding process, which decodes compressed image data; and estimating a level of image quality degradation based on decided effectiveness.

Effect of the Invention

An advantageous effect of the present invention is that an image quality degradation level, which indicates the level of image quality degradation, occurred in decoding, can be estimated with good accuracy. The reason is that an effectiveness of error concealment processing, which obscures pixels not decoded correctly, is inspected and the image quality is estimated based on the effectiveness.

EXPLANATION OF SYMBOLS

Figure 1:
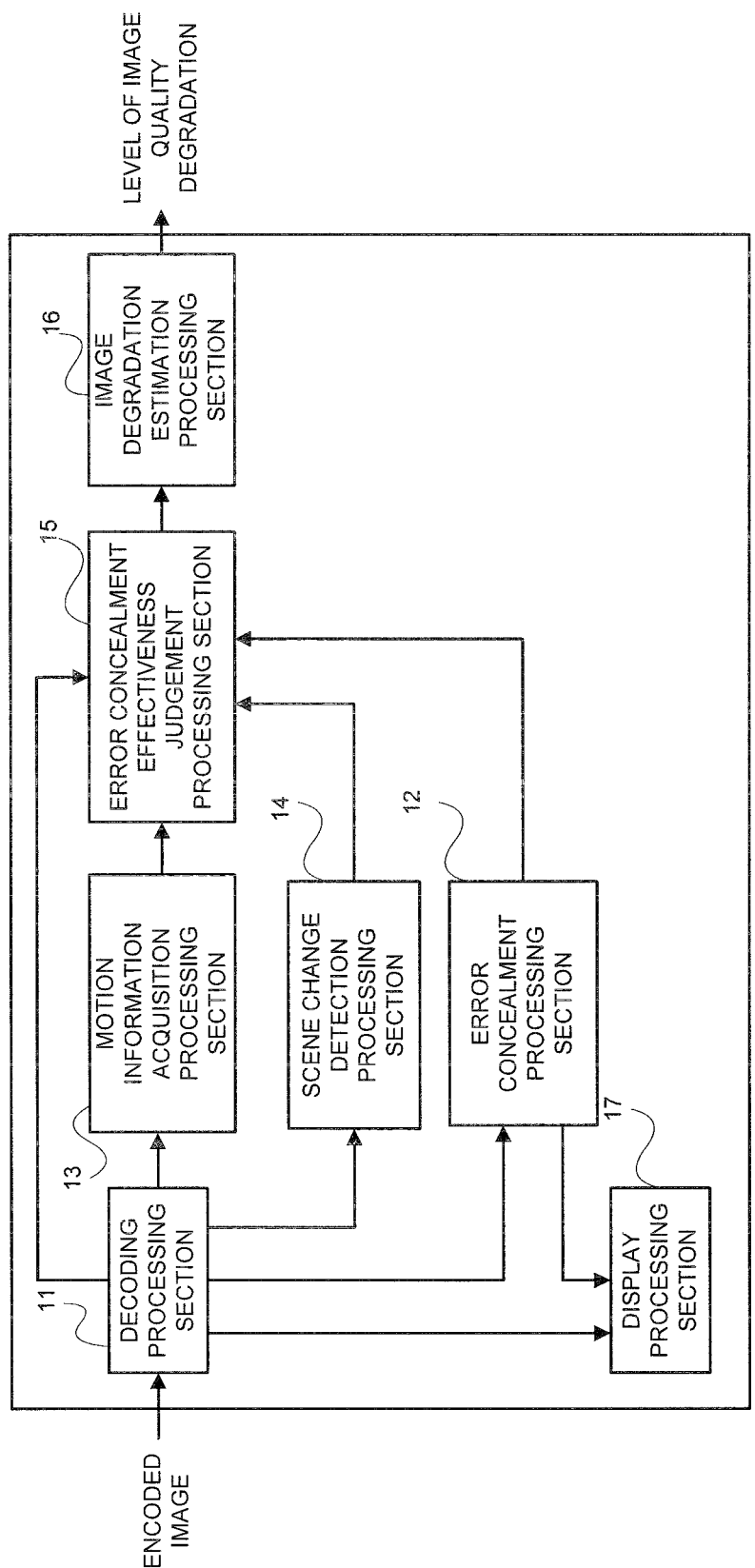
FIG. 1 is a block diagram illustrating the configuration of an image quality evaluating apparatus according to the present invention.

12 Error concealment processing section
13 Motion information acquisition processing section
14 Scene change detection processing section
15 Error concealment effectiveness judging processing section
16 Image quality degradation estimation processing section
17 Display processing section
21 Motionless area
22 Large motion area
41 Program control processor
42 Input data buffer
43 Output data buffer
44 Program memory
441 Decoding processing
442 Error concealment processing
443 Motion information acquisition processing
444 Scene change detection processing
445 Error concealment effectiveness judgement processing
446 Image quality degradation estimation processing
447 Display processing

BEST MODE FOR CARRYING OUT THE INVENTION

According to the present invention, on the occasion of incorrect decoding, whether or not image quality degradation has been suppressed through error concealment processing is judged based on information obtained in the course of decoding so that the level of image quality degradation is estimated. For example, when it is judged that the error concealment has worked effectively, the image quality degradation of an image region, not decoded correctly, is estimated to be small. In contrast, when it is judged that the error concealment has not worked effectively, the image quality degradation is estimated to be large. By estimating the image quality, with images viewed finally by a viewer after the error concealment processing, degradation in image quality can be estimated with good precision.

The detail of the present invention will be explained by referring to FIG. 1. FIG. 1 is a block diagram illustrating the configuration of an image quality evaluating apparatus according to the present invention. Referring to FIG. 1, the image quality evaluating apparatus includes a decoding processing section 11, an error concealment processing section 12, a motion information acquisition processing section (a motion information processing section) 13, a scene change detecting section 14, an error concealment effectiveness judgement processing section 15, an image quality degradation estimation processing section 16, and a display processing section 17.

The decoding processing section 11 decodes coded image data (or coded data) transmitted via a transmission line to obtain images. The coding scheme is a coding scheme including motion compensated inter-frame prediction based on motion vector such as MPEG-2. The error concealment processing section 12 performs an error concealment process or a process for hiding errors contained in image data prior to being subjected to decoding, in an error occurring image region. The motion information acquisition processing section 13 captures motion vector in bit stream from the decoding processing section 11 and calculates information regarding a magnitude of motion of a video. The scene change detecting section 14 decides whether or not a scene change (a change in scene) has occurred based on information input from the decoding processing section 11.

The error concealment effectiveness judgement processing section 15 decides whether or not the degradation of image quality has been prevented through the error concealment process executed by the error concealment processing section in the decoding process. The image quality degradation evaluation processing section 16 estimates a level of image quality degradation and outputs the estimated image quality degradation level. The display processing section 17 displays the image video obtained by the decoding processing section 11 through the decoding process.

Referring to FIG. 1, the image quality evaluating apparatus further includes a section for performing an image decoding process in a receiver (or the decoding processing section 11) and a section for displaying images based on image data received via the transmission line (or the display processing section 17), in addition to the block for evaluating images.

First Embodiment

Figure 2:
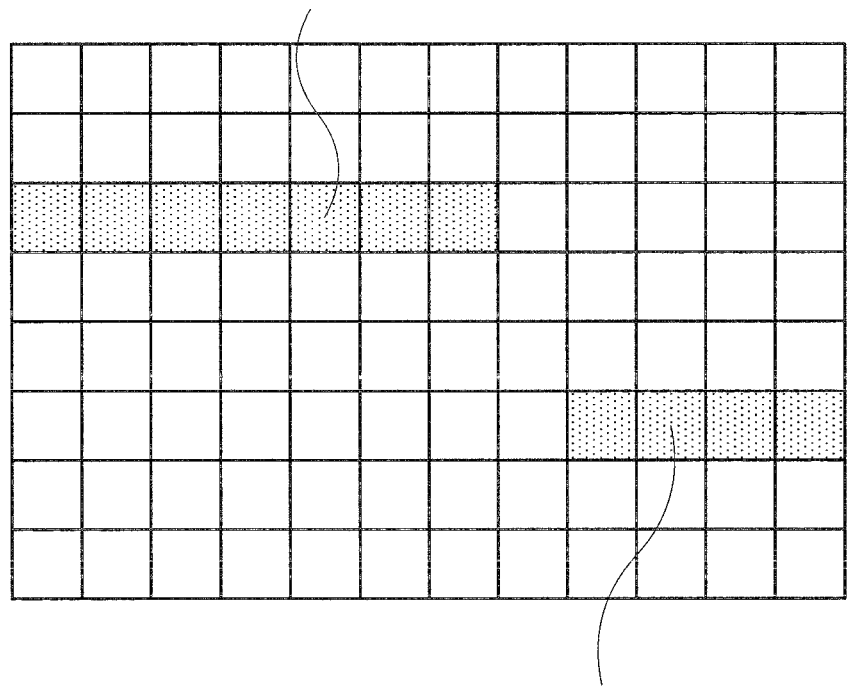
FIG. 2 is an explanatory diagram explaining a difference in effectiveness of error concealment to a magnitude of motion.
Figure 3:
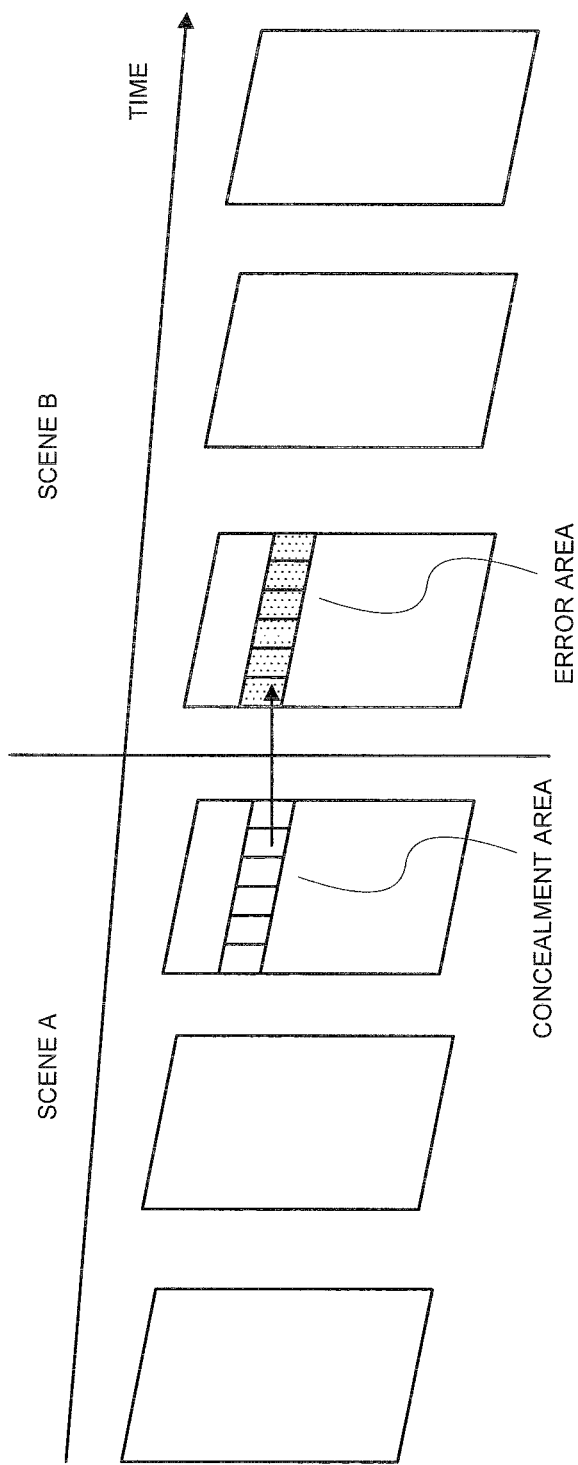
FIG. 3 is an explanatory diagram explaining a difference in effectiveness of error concealment to the presence or absence of a change in scene.
Figure 4:
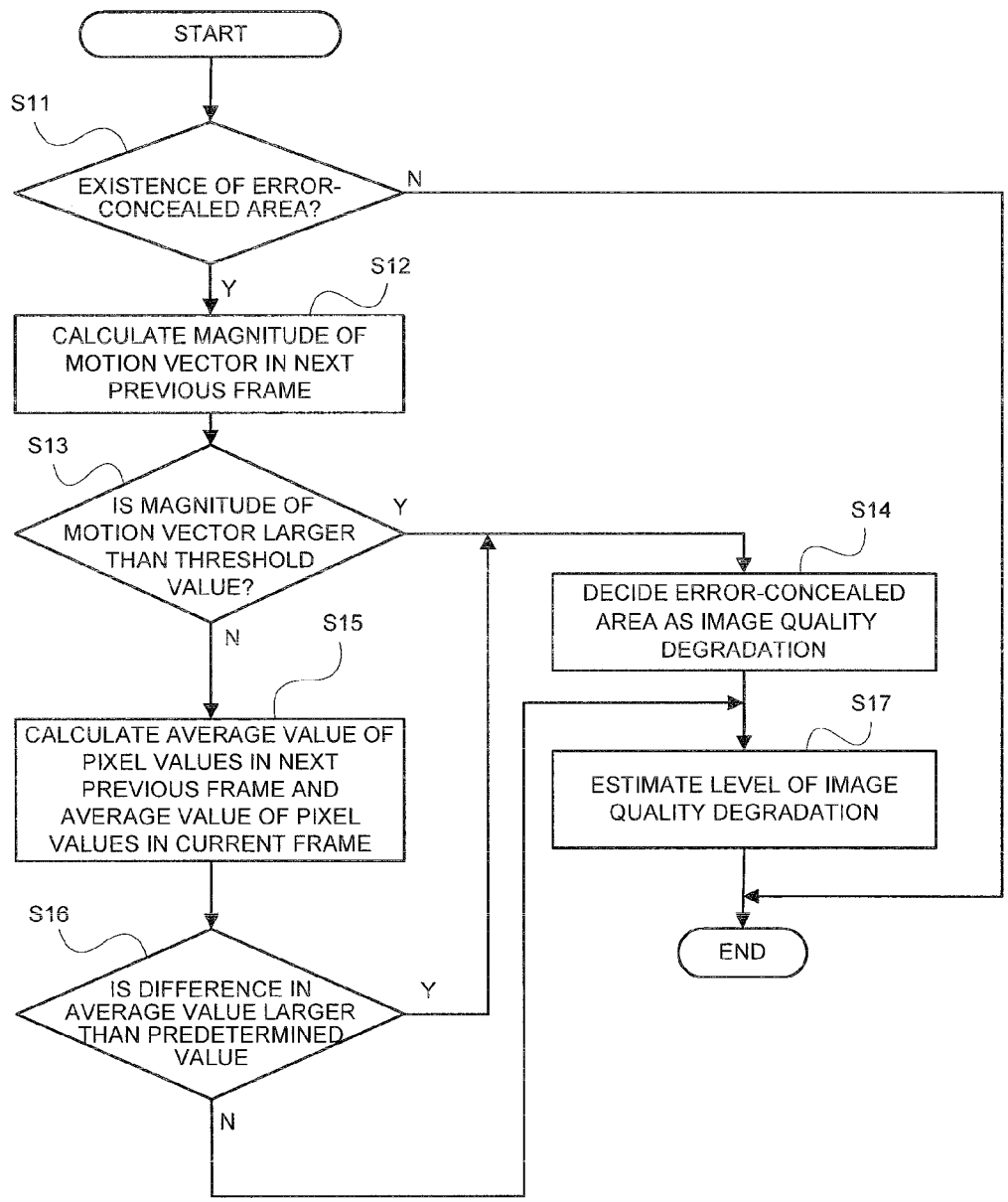
FIG. 4 is a flow chart illustrating an operation of the major portion of an image quality evaluating apparatus according to a first embodiment.

The whole operation of the first embodiment will be explained below by referring to FIG. 1, FIG. 2, FIG. 3, and FIG. 4. FIG. 2 is an explanatory diagram explaining a difference in effectiveness of error concealment due to magnitudes of motion. FIG. 3 is an explanatory diagram explaining a difference in effectiveness of error concealment due to the presence or absence of a scene change. FIG. 4 is a flowchart showing an operation of a main portion of the image quality evaluating apparatus.

In the image quality evaluating apparatus shown in FIG. 1, the decoding processing section 11 decodes input encoded data and the display processing section 17 receives the pixel information obtained through decoding. The display processing section 17 displays videos on the display (not shown) based on pixel information.

When the decoding processing section 11 does not perform a decoding process correctly, due to an error in the transmission line or due to a decoding process being late for the display timing, the imperfectly decoded pixel information (information on pixels not decoding correctly) is output to the error concealment processing section 12. The error concealment processing section 12 performs an image quality degradation hiding process to an image region not decoded correctly to hide an error in image data caused by transmission errors, and thus outputs pixel information to the display processing section 17. In this case, the display processing section 17 displays videos based on the pixel information subjected to the error concealment process.

The error concealment process is realized, for example, by repeatedly displaying pixels at the same positions in a completely decoded frame or averaging pixels at the same positions in plural completely decoded frames. However, the error concealment process should not be limited only to the above example. Various methods publicly known in the error concealment process are applicable to the present invention. Information regarding an occurrence of an error concealment process (or error concealment processing occurrence information) is output from the error concealment processing section 12 to the error concealment effectiveness judgement processing section 15.

When error concealment process occurrence information is input, the error concealment effectiveness judgement processing section 15 begins judging whether or not a degradation of an image quality has been prevented through the error concealment process (step S11). The error concealment effectiveness judgement processing section 15 judges the effectiveness of an error concealment process based on a magnitude of motion of a video or based on the presence or absence of a scene change. For example, FIG. 2 shows a video frame divided into macro blocks, each being a coding process unit such as MPEG-2. However, a magnitude of motion can be discriminated for each macro block.

It is assumed that the areas (or motionless areas) 21 shown in FIG. 2 correspond to the areas where videos are in still state. The error concealment processing section 12 copies pixels at the same positions in the immediately previous frame through an error concealment process to obscure the degradation in image quality of the motionless areas 21. The term, motionless area, means an area that moves slowly, in addition to an area that is completely still. It is assumed that the area (a large motion area) 22, shown in FIG. 2 is an area where a video moves largely. In such a case, even if pixel data at the same positions in the immediately previous frame decoded correctly is copied through the error concealment process, the image quality degradation is detected easily due to a large difference to adjacent areas. When a magnitude of motion is larger than a predetermined threshold value, the error concealment effectiveness judgement processing section 15 can judge that the effectiveness of the error concealment has not been obtained.

Upon an occurrence of transmission error at the time of a scene change, if pixel data used in the error concealment process is pixel data in a frame prior to a scene change, the difference becomes large to adjacent areas so that a degradation of image quality becomes conspicuous. That is, the effectiveness of the error concealment becomes low. FIG. 3, for example, shows the case where an error occurrence spot matches with a scene change occurrence spot. When an error occurs at the leading frame in the scene B, the error concealment processing section 12 performs an error concealment process using pixel data for an immediately preceding frame belonging to the scene A. In that case, the effectiveness of the error concealment cannot be obtained so that the degradation of an image quality becomes larger. Accordingly, upon an occurrence of a scene change, the error concealment effectiveness judgement processing section 15 judges that the effectiveness of error concealment cannot be obtained but judges that the image quality in an image area subjected to an error concealment process has degraded.

Accordingly, in the present embodiment, the error concealment effectiveness judgement processing section 15 uses information regarding a magnitude of motion of a video and information on whether or not a scene change has occurred, to judge the effectiveness of an error concealment process.

Specifically, a value of motion vector upon decoding is output from the decoding processing section 11 to the motion information acquisition processing section 13. The motion information acquisition processing section 13 calculates information regarding a magnitude of motion of a video. The information regarding a magnitude of motion is calculated as a magnitude of motion vector by motion compensated inter-frame prediction in a pixel block at the same position in a frame decoded just previously and correctly (step S12). The magnitude of motion vector is determined, for example, by adding an absolute value of the x component (horizontal component) of a vector and an absolute value of the y component (vertical component) of the vector. Alternatively, the magnitude of motion vector may be determined by using a square sum of the x component and the y component of a motion vector or a square root of the square sum thereof.

In some coding modes, the coding is performed using only the information in a frame, without using the motion compensated inter-frame prediction. In that case, the motion information acquisition processing section 13 cannot decide a magnitude of motion because of no motion vector. The motion information acquisition processing section 13 decides that the motion of a video is as large as an effect cannot be obtained in the motion compensated inter-frame prediction or decides a magnitude of motion using motion vectors in the frame in more past.

Pixel information upon decoding is output from the decoding processing section 11 to the scene change detection processing section 14. The scene change detection processing section 14 decides whether or not a scene change has occurred based on pixel information entered. The presence or absence of a scene change, for example, is judged according to the method for inspecting the magnitude of a difference between an average value of pixel values, which have already decoded, in the next previous frame decoded correctly and an average value of pixel values, which have already decoded in a frame during currently decoding (steps S15 and S16). That is, when the difference in averaged pixel value is larger than a predetermined value (a threshold value), it is decided that a scene change has occurred. However, the deciding method in the present invention should not be limited only to the method of deciding the presence or absence a scene change.

Information regarding a magnitude of motion is output from the motion information acquisition processing section 13 to the error concealment effectiveness judgement processing section 15. Information regarding the presence or absence of a scene change is output from the scene change detection processing section 14 to the error concealment effectiveness judging processing section 15.

When a magnitude of motion is larger than a threshold value or a scene change occurs, the error concealment effectiveness judging processing section 15 decides that the effectiveness of error concealment cannot be obtained but determines that the image quality has degraded in the image area subjected to the error concealment process (steps S13, S16 and S14).

The image quality degradation estimation processing section 16 summarizes the number of pixels or the number of blocks in the image area, of which the image quality has been degraded, or digitizes the effectiveness of the error concealment process, thus summarizing a total of numerical values for one frame. The level of image quality degradation is evaluated based on a magnitude of the summarized value (step S17). The level of image quality degradation calculated by the image quality degradation estimation processing section 16 is output from the image quality evaluating device. The image quality degradation estimation processing section 16, for example, outputs the summarized value as an image quality degradation level and outputs data indicating a degradation of an image quality, as an image quality degradation level, when the summarized value exceeds a predetermined threshold value.

Second Embodiment

Figure 5:
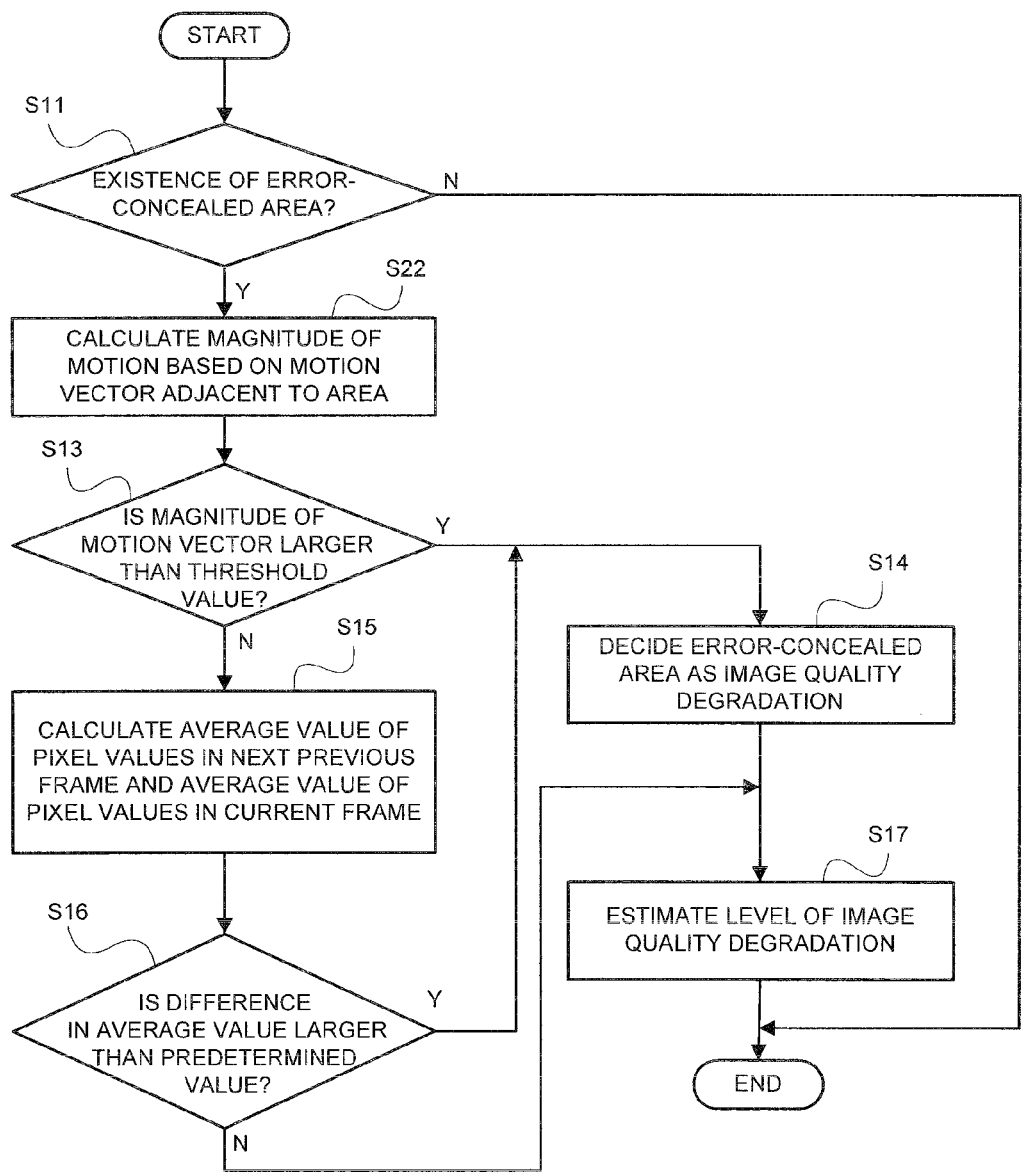
FIG. 5 is a flow chart illustrating an operation of the major portion of an image quality evaluating apparatus according to a second embodiment.

Next, a second embodiment of the present invention will be explained below. The second embodiment differs from the first embodiment in the motion magnitude calculating method. FIG. 5 is a flow chart showing an operation of the main portion of the image quality evaluating device. The second embodiment is identical to the first embodiment, except for the motion magnitude calculating method.

In the second embodiment, the motion information acquisition processing section 13 calculates information regarding a magnitude of motion, based on one motion vector or more decoded correctly adjacent to pixel positions, of which magnitudes of motion are to be determined, in a frame on decoding or in plural frames already decoded (step S22). Information regarding a magnitude of motion is determined, for example, using the method of determining the sum of an absolute value of the x component and an absolute value of the y component of an average vector of a motion vector temporally referring to a past frame and the sum of an absolute value of the x component and an absolute value of the y component of an average vector of a motion vector temporally referring to a future frame. That is, a magnitude of motion is obtained based on one or plural frames decoded normally adjacent to a frame, which contains an error. In concrete, a magnitude of motion is determined by using only normally decoded frames, or frames behind and ahead of an error containing frame (or image frames positioned before and after an error containing frame), or using only the previous frame or only the rear frame.

By calculating motion magnitudes of one or plural motion vectors, the motion information acquisition processing section 13 can estimate a level of image quality degradation with good precision.

Third Embodiment

Figure 6:
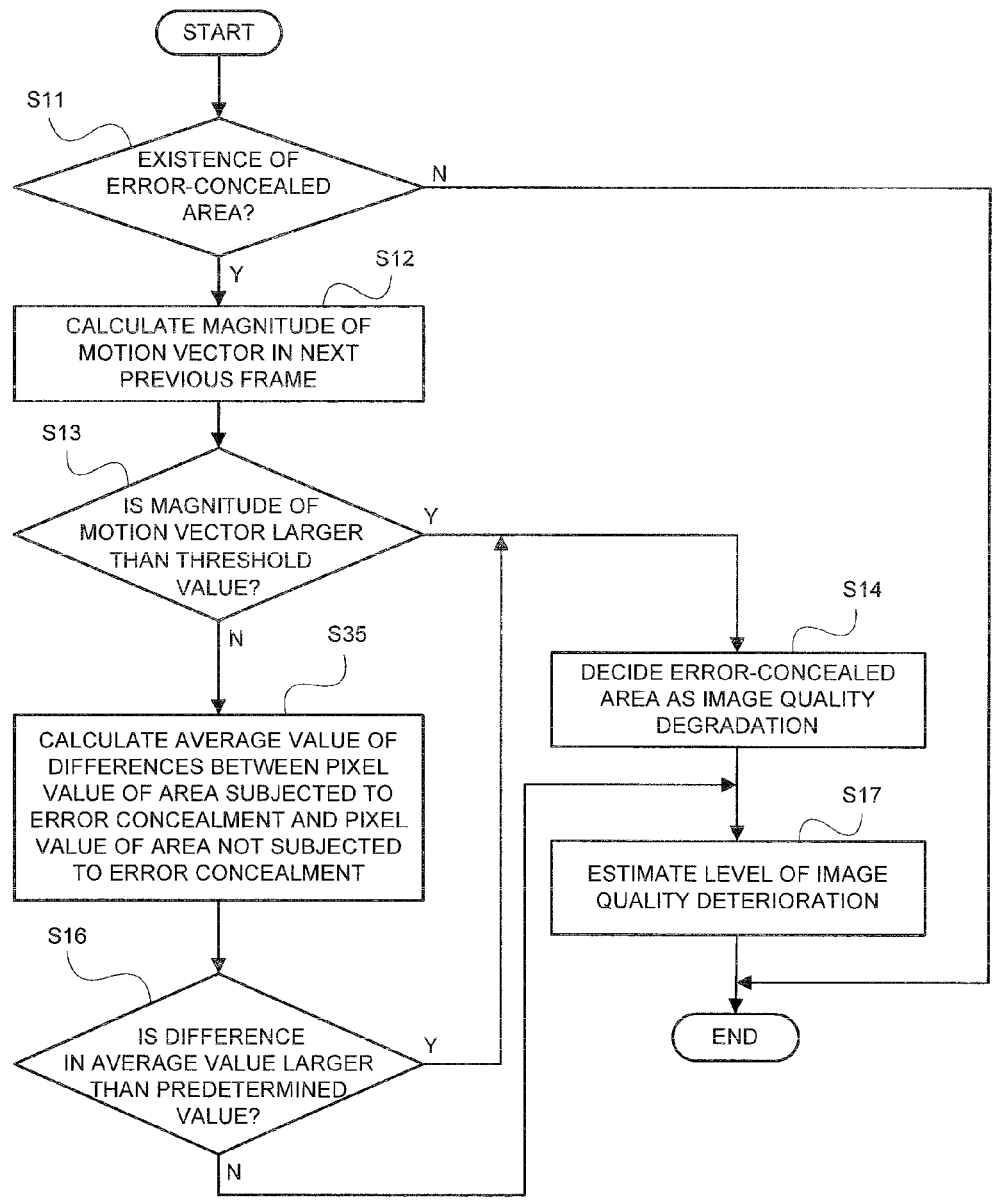
FIG. 6 is a flow chart illustrating an operation of the major portion of an image quality evaluating apparatus according to a third embodiment.

Next, a third embodiment of the present invention will be explained below. In the third embodiment, the error concealment effectiveness judgement processing section 15 uses information, which excludes magnitudes of motion and the presence or absence of a scene change, to judge the effectiveness of error concealment. FIG. 6 is a flow chart showing an operation of the main portion of the image quality evaluating device. The third embodiment is identical to the first and second embodiments, except for the process of the error concealment effectiveness judgement processing section 15.

As shown in FIG. 1, the decoding processing section 11 decodes encoded data entered and the display processing section 17 displays the decoded video. When the decoding is not performed normally due to an error on the transmission line, the error concealment processing section 12 subjects the erroneously decoded image area to the image quality degradation hiding process and thus the processed image is displayed on the display processing section 17. The error concealment processing section 12 outputs the information representing all areas subjected to the error concealment process and pixel values in those areas after the error concealment, to the error concealment effectiveness judgement processing section 15. Moreover, the decoding processing section 11 outputs the normally decoded pixel values to the error concealment effectiveness judgement processing section 15.

The error concealment effectiveness judgement processing section 15 calculates the difference between a pixel value after the error concealment process in the area subjected to the error concealment process and a pixel value after the error concealment process in the area not subjected to the error concealment process and compares an average difference value of per pixel with a threshold value (steps S35 and S36). The effectiveness of the error concealment process is judged based on the average difference value per pixel and based on the threshold value. Specifically, since the area having a value larger than the threshold value lacks the continuity with the normally decoded area, it is decided that the effectiveness of the error concealment process is low. When the corresponding area is smaller than the threshold value, it is judged that the continuity with the normally decoded area is held and that the possibility is high that the error concealment may prevent the degradation of an image quality.

The error concealment effectiveness judgement processing section 15 outputs the information regarding to presence or absence of effectiveness of the error concealment process to the image quality degradation estimation processing section 16. The image quality degradation estimation processing section 16 summarizes the number of pixels or the number of blocks, which is judged as an image quality degraded with no effectiveness of the error concealment process. The level of image quality degradation is evaluated based on the magnitude of the summarized value.

Fourth Embodiment

Next, a fourth embodiment of the present invention will be explained by referring to FIG. 7. In the fourth embodiment, the image quality evaluating device in the first embodiment is realized by a computer system.

Figure 7:
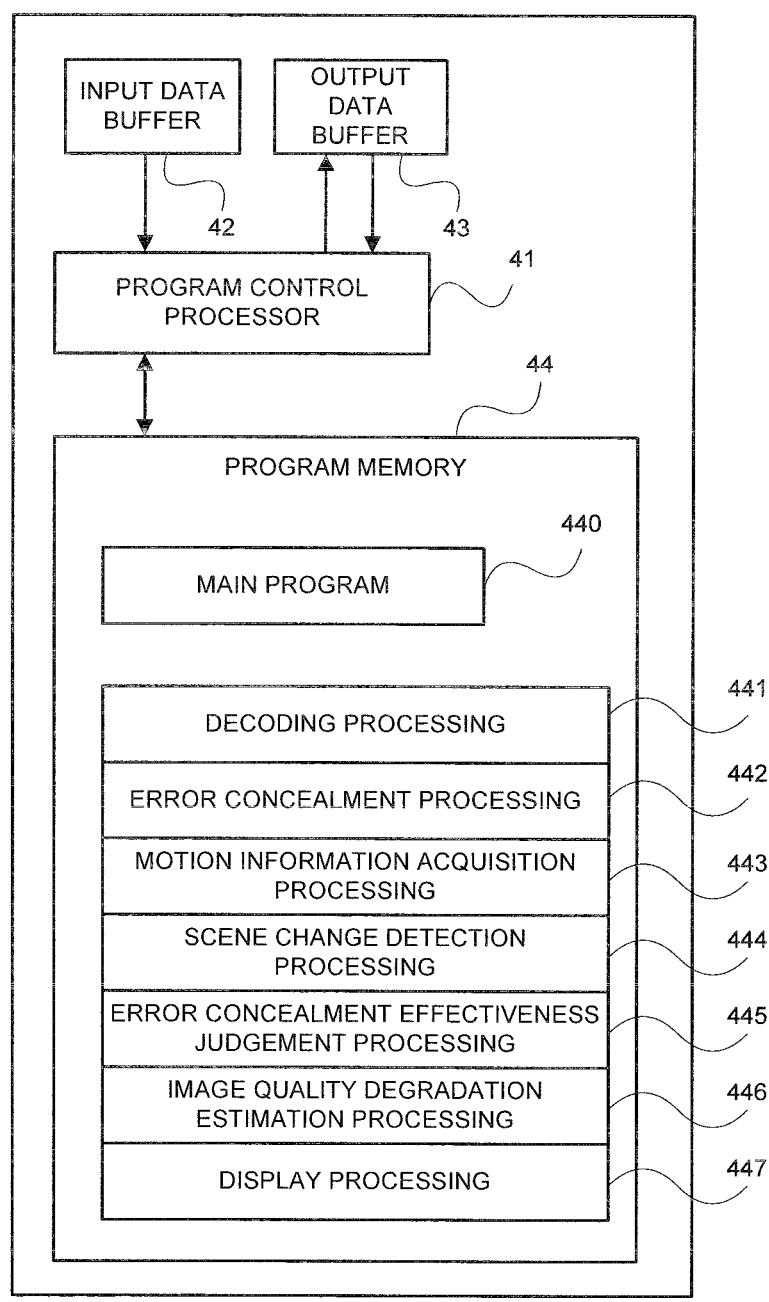
FIG. 7 is a block diagram illustrating a computer system according to a fourth embodiment of the present invention.

FIG. 7 is a block diagram illustrating an image quality evaluating system in the computer system according to the fourth embodiment. The image quality evaluating system is equipped with the program control processor 41, as shown in FIG. 7. The program control processor 41 is connected to the program memory 44, which stores necessary programs, together with the input data buffer 42 and the output data buffer 43. The program module stored in the program memory 44 includes a decoding processing module 441, an error concealment processing module 442, a motion information acquisition processing module 443, a scene change detection processing module 444, an error concealment effectiveness judgement processing module 445, an image quality degradation estimation processing module 446, and a display processing module, in addition to the main program. The main program execute an image quality evaluation process.

Program modules for the decoding processing module 441, the error concealment processing module 442, the motion information acquisition processing module 443, the scene change detection processing module 444, the error concealment effectiveness judgement processing module 445, the image quality degradation estimation processing module 446, and the display processing module 447 are programs for realizing the functions of the decoding processing section 11, the error concealment processing section 12, the motion information acquisition processing section 13, the scene change detection processing section 14, the error concealment effectiveness judgement processing section 15, the image quality degradation estimation processing section 16, and the display processing section 17, respectively. The program control processor 41 executes procedures according to the main program and various function modules in the image quality evaluating system. Thus, the image quality evaluating device in the first embodiment executes the image quality evaluating process. Even in the second and third embodiments, the program modules for realizing the functions of various sections may be built realistically in the computer system.

Next, an image quality evaluating device will be explained below according to a specific embodiment of the present invention.

It is now assumed that a transmitter transmits image data of the SDTV size (720 pixels in horizontal, 480 pixels in vertical, and 29.97 frames per second) encoded in MPEG-2 scheme, with the internet protocol (IP) and that the image quality evaluating device of the present invention receives the image data. Moreover, it is assumed that the transmission line on which image data is loaded causes a loss of data with a probability of 1%. The received image data is input to the image quality evaluating device shown in FIG. 1.

The decoding processing section 11, shown in FIG. 1, decodes image data encoded in MPEG-2 coding scheme. The display processing section 17 displays the image based on the decoded image data. The data loss occurring on the transmission line leads to incorrect decoding. In that case, the process is performed for hiding the image area, which has not been decoded correctly, in the error concealment processing section 12. The error concealment process is executed by displaying repeatedly the pixels at the same position as that of the incorrectly decoded image area in the just previous frame.

It is assumed, for example, that the 48×16 pixel area on the lower right hand in an image frame (or corresponding to three macro blocks in MPEG-2 coding scheme) is not decoded correctly. The three macro blocks are represented with M1, M2, and M3, respectively. The image quality degradation is hidden by copying the 48×16 pixel area, corresponding to area at the same positions as those of the macro blocks M1, M2, and M3 in the just previous image frame, over the image frame during incorrect decoding.

The error concealment effectiveness judgement processing section 15 receives the information regarding an occurrence of an error concealment process from the error concealment processing section 12 and then decides whether or not the error concealment process has been able to prevent the degradation of image quality. The error concealment effectiveness judgement processing section 15 acquires information regarding the magnitude of motion from the motion information acquisition processing section 13, for the purpose of decision. The motion information acquisition processing section 13 determines the magnitude of motion based on motion vectors in the macro blocks defined at the positions of the macro blocks M1, M2, and M3 in the just previous image frame.

In the just previous image frame, it is now assumed that the motion vector of the macro block M1 is (10, 5) and that the motion vector of the macro block M2 is (12, 5) and that the motion vector of the macro block M3 is (1, 0). By presumption, the motion information acquisition processing section 13 calculates the magnitude of motion as the sum of the absolute value of the x component and the absolute value of the y component of a motion vector. The magnitude of motion in the macro block M1 is |10|+|5|=15. Thus, the magnitude of motion in the macro block M2 is |12|+|5|=17. The magnitude of motion in the macro block M3 is |1|+|0|=1. It is assumed that the threshold value for deciding a magnitude of motion is 10. The motion information acquisition processing section 13 decides that the macro blocks M1 and M2 have a large movement because the magnitudes of motion of the macro blocks M1 and M2 are larger than the threshold value.

Because the magnitude of motion of the macro blocks M3 is smaller than the threshold value, the motion information acquisition processing section 13 decides that the macro block M3 has a small movement. Next, the motion information acquisition processing section 13 decides the presence or absence of a change in scene. The scene change detection processing section 14 compares all pixels decoded precedent to the macro block M1 from the pixels on the upper left hand in the image frame during decoding, with the pixels at the same positions in the just previous frame, thus deciding the presence or absence of a scene change. It is now assumed that the scene change detection processing section 14 has decided the absence of scene change.

The error concealment effectiveness judgement processing section 15 receives information regarding the magnitude of motion in a pixel area subjected to an error concealment process and information regarding the presence or absence of a scene change. The error concealment effectiveness judgement processing section 15 judges that the error concealment has not worked effectively to all areas subjected to an error concealment process in macro blocks judged as having a large movement or in a frame judged as having a scene change.

In the present embodiment, since the motion of the macro blocks M1 or M2 is large, it is judged that there is no effectiveness of error concealment therein. Information indicating the resultant decision results is output to the image quality degradation estimation processing section 16. The image quality degradation estimation processing section 16 decides two macro blocks judged as no effectiveness of error concealment, as an image quality degradation level in the image frame. That process is applied to each frame. If it is decided that the next frame includes 10 macro blocks with no effectiveness of error concealment, the image quality degradation level becomes 10, thus indicating that the image quality in the next frame is in a larger degradation level.

The present application claims the priority rights based on Japanese Patent application No. 2007-021310 filed on Jan. 31, 2007 and the entire of the disclosure is incorporated here.

INDUSTRIAL APPLICABILITY

The present invention is applied suitably to an image quality decoding system that executes not only a decoding process for decoding compressed image data but also an error concealment process for recovering errors in image data.

The invention claimed is:

1. An image quality evaluating method for executing an error concealment process that decodes compressed image data and recovers an error in image data, said method comprising the steps of:
   determining a presence or an absence of a change in scene contained in a video by examining information regarding a magnitude of a difference between average pixel values of successive frames of the video, wherein a single average pixel value is obtained for each successive frame, and the single average pixel value for the successive frames is compared to determine the difference;
   judging an effectiveness of an error concealment process executed in said decoding process, which decodes compressed image data based on the determination of whether a change in scene occurred; and
   specifying a level of image quality degradation, based on a magnitude of a sum of a number of pixels or number of blocks judged that there is no effectiveness of an error concealment process.

2. The image quality evaluating method defined in claim 1, further comprising the step of:
   concealing an error contained in image data prior to decoding in the error concealment process.

3. The image quality evaluating method, defined in claim 2, further comprising the step of:
   concealing an error due to transmission error in the error concealing process when compressed image data is image data received via a transmission line.

4. The image quality evaluating method, defined in claim 1, further comprising the step of:
   when compressed image data is image data encoded in a predetermined coding scheme, recovering errors in an image area, which has not been demodulated correctly in an image area demodulating process based on said coding scheme, in the error concealment process.

5. The image quality evaluating method, defined in claim 1, further comprising the steps of:
   replacing erroneous pixels with pixels in a frame demodulated correctly in further past, compared with an erroneous frame, in an error concealment process; and
   judging an effectiveness of said error concealment process based on information regarding a magnitude of motion in a video.

6. The image quality evaluating method, defined in claim 5, further comprising the step of:
   when compressed image data is image data encoded in a coding scheme, which contains a motion compensated inter-frame prediction based on motion vectors, obtaining the information regarding the magnitude of motion of the video based on motion vectors in a bit stream.

7. The image quality evaluating method, defined in claim 6, further comprising the step of:
   estimating a magnitude of motion in a current frame based on a motion vector value of a frame completely decoded.

8. The image quality evaluating method, defined in claim 7 further comprising the step of:
   determining the information regarding the magnitude of motion of the video, using a sum of absolute values, a sum of squares, or a square root of a square sum of a vertical component and a horizontal component of a motion vector.

9. The image quality evaluating method, defined in claim 5, further comprising the step of:
   determining the information regarding the magnitude of motion of the video based on one or plural frames normally decoded adjacent to an error containing frame.

10. The image quality evaluating method defined in claim 5, further comprising the step of:
    determining the information regarding the magnitude of motion of the video based on frames ahead or behind an error containing frame or based on a frame only ahead said error containing frame or based on a frame only behind said error containing frame.

11. The image quality evaluating method defined in claim 1, wherein the specifying is based on a comparison of the magnitude of the sum with a predetermined threshold.

12. An image quality evaluating apparatus used in an image decoding system, said system including a decoding processing section for decoding compressed image data and an error concealment processing section for executing an error concealment process, which recovers an error in the image data; said apparatus comprising:
    an error concealment effectiveness judgment processing section for judging an effectiveness of an error concealment process executed by said error concealment processing section in a decoding process, which decodes compressed image data;
    a scene change detection processing section for detecting the presence or absence of a change in scene contained in a video by examining information a magnitude of a difference between average pixel values of successive frames of the video, wherein a single average pixel value is obtained for each successive frame, and the single average pixel value for the successive frames is compared to determine the difference; and
    an image quality degradation estimation processing section for specifying a level of image quality degradation, based on a magnitude of a sum of a number of pixels or number of blocks judged that there is no effectiveness of an error concealment process,
    wherein said error concealment effectiveness judgment processing section judges the effectiveness of an error concealment process based on whether a change in scene occurred.

13. The image quality evaluating apparatus defined in claim 12, further comprising a motion information processing section for calculating information regarding a magnitude of motion of a video; and wherein said error concealment processing section replaces erroneous pixels with pixels in a frame demodulated correctly in further past, compared with an erroneous frame, in an error concealment process; and wherein said error concealment effectiveness judgment processing section further decides an effectiveness of an error concealment process based on information regarding a magnitude of motion of a video calculated by said motion information processing section.

14. The image quality evaluating apparatus defined in claim 13, wherein when a compressed image corresponds to image data encoded in a coding scheme containing a motion compensated inter-frame prediction based on motion vectors, said motion information processing section determines the information regarding the magnitude of motion of a video based on a motion vector in a bit stream.

15. The image quality evaluating apparatus defined in claim 14, wherein said motion information processing section estimates a magnitude of motion in a current frame based on a motion vector value of a frame completely decoded.

16. A computer readable storage device having an image quality evaluating program directing a computer, which is used suitably to an image decoding system that executes a decoding process that decodes compressed image data and executes an error concealment process that recovers an error in image data, to execute the steps of:

determining a presence or an absence of a change in scene contained in a video by examining information regarding a magnitude of a difference between average pixel values of successive frames of the video, wherein a single average pixel value is obtained for each successive frame, and the single average pixel value for the successive frames is compared to determine the difference;

judging an effectiveness of an error concealment process executed in the decoding process, which decodes compressed image data, based on the determination of whether a change in scene occurred; and specifying a level of image degradation based on a magnitude of a sum of a number of pixels or number of blocks judged that there is no effectiveness of an error concealment process.

* * * * *